US012754888B2

(12) United States Patent
Lanfranchi et al.

(10) Patent No.: US 12,754,888 B2
(45) Date of Patent: Oct. 6, 2026

(54) SYNTHETIC TABULAR METADATA GENERATOR USING LARGE LANGUAGE MODELS

(71) Applicant: Oracle International Corporation, Redwood Shores, CA (US)

(72) Inventors: Clemence Lanfranchi, Zurich (CH); Marcel Gwerder, Dietikon (CH); Margherita Musumeci, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 18/595,852

(22) Filed: Mar. 5, 2024

(65) Prior Publication Data

US 2025/0284670 A1 Sep. 11, 2025

(51) Int. Cl.
*G06F 16/00* (2019.01)
*G06F 16/21* (2019.01)
*G06F 40/284* (2020.01)

(52) U.S. Cl.
CPC .......... *G06F 16/213* (2019.01); *G06F 40/284* (2020.01)

(58) Field of Classification Search
None
See application file for complete search history.

(56) References Cited

U.S. PATENT DOCUMENTS 7,293,008 B2 * 11/2007 Potter ................. G06F 16/2457
7,603,651 B2 * 10/2009 De Brabander .......... G06F 8/34 717/109
9,348,815 B1 5/2016 Estes
9,495,398 B2 * 11/2016 Parkkinen ............... G06F 16/22
9,535,902 B1 1/2017 Michalak
10,977,155 B1 * 4/2021 Muras ................. G06F 11/3608
11,113,269 B1 * 9/2021 Andrade Garcia ... G06F 16/211
11,615,246 B2 3/2023 Reisswig
11,860,939 B2 * 1/2024 Liu ..................... G06F 16/8373
12,271,374 B1 4/2025 Lai
12,554,932 B2 2/2026 Chandrahasan
2004/0243387 A1 * 12/2004 De Brabander .......... G06F 8/34 704/1
2005/0187913 A1 * 8/2005 Nelken ................. G06F 16/245

(Continued)

OTHER PUBLICATIONS

Lexicon-based prompt for financial dimensional sentiment analysis, Wei Lin (Year: 2024).*

(Continued)

*Primary Examiner* — Jean M Corrielus
(74) *Attorney, Agent, or Firm* — Hickman Becker Bingham Ledesma LLP

(57) ABSTRACT

In an embodiment, a computer generates a lexical prompt for a large language model (LLM) that accepts the prompt as input, which causes the LLM to generatively infer a hybrid table schema that contains natural language that describes a data table. The prompt may contain linguistic exemplar(s) that are generated from statically or dynamically selected predefined data tables. As discussed herein, task accuracy of computer inferencing is increased by novel static exemplar (s), and semantic accuracy of computer inferencing is increased by novel dynamic selection of most semantically similar dynamic exemplar(s). Dynamic selection of exemplars is accelerated by indexing of learned semantic vector encodings of predefined and new data tables.

21 Claims, 5 Drawing Sheets

(56) References Cited

U.S. PATENT DOCUMENTS

| | | | | |
|---|---|---|---|---|
| 2006/0167929 | A1* | 7/2006 | Chakraborty | G06F 16/86 707/999.102 |
| 2007/0288444 | A1* | 12/2007 | Nelken | G06F 16/3329 |
| 2012/0054217 | A1* | 3/2012 | Clarke | G06F 16/954 707/769 |
| 2012/0215752 | A1* | 8/2012 | Parkkinen | G06F 16/22 707/705 |
| 2015/0026221 | A1* | 1/2015 | Shimno | G06F 16/215 707/803 |
| 2015/0213206 | A1* | 7/2015 | Amarasingham | G16H 50/30 705/2 |
| 2015/0213207 | A1* | 7/2015 | Amarasingham | G16H 50/50 705/2 |
| 2015/0213222 | A1* | 7/2015 | Amarasingham | G16H 50/30 705/2 |
| 2015/0213223 | A1* | 7/2015 | Amarasingham | G16H 50/30 705/2 |
| 2016/0063126 | A1* | 3/2016 | Nelken | G06F 16/3329 707/726 |
| 2018/0203924 | A1* | 7/2018 | Agrawal | G06F 16/338 |
| 2018/0218259 | A1* | 8/2018 | Braz | G06N 5/043 |
| 2018/0357220 | A1 | 12/2018 | Galitsky | |
| 2020/0117712 | A1 | 4/2020 | Xu | |
| 2020/0356594 | A1* | 11/2020 | Liu | G06F 16/2452 |
| 2021/0019312 | A1* | 1/2021 | Shaik | G06F 16/24522 |
| 2021/0271697 | A1* | 9/2021 | Agrawal | G06F 16/338 |
| 2021/0390101 | A1* | 12/2021 | Shaik | G06F 16/2282 |
| 2023/0132061 | A1 | 4/2023 | Pfitzmann | |
| 2023/0206000 | A1 | 6/2023 | Reisswig | |
| 2023/0237272 | A1 | 7/2023 | Teixeira de Abreu Pinho | |
| 2023/0401236 | A1* | 12/2023 | Katsipoulakis | G06F 16/283 |
| 2024/0154941 | A1 | 5/2024 | Nagpal | |
| 2024/0330603 | A1* | 10/2024 | Tu | G06F 40/30 |
| 2024/0403373 | A1* | 12/2024 | Chao | G06F 16/9532 |
| 2025/0045256 | A1* | 2/2025 | Gottlob | G06F 16/2365 |
| 2025/0190604 | A1 | 6/2025 | Fu | |
| 2025/0217351 | A1* | 7/2025 | Tan | G06F 16/2423 |
| 2025/0258819 | A1 | 8/2025 | Jain | |
| 2025/0284688 | A1* | 9/2025 | Yakovlev | G06F 16/243 |

OTHER PUBLICATIONS

Error Analysis Prompting Enables Human-Like Translation Evaluation in Large Language Models—A Case Study on ChatGPT, Qingyu Lu (Year: 2023).*

Prompting a Large Language Model to Generate Diverse Motivational Messages, Samuel et al., (Year: 2023).*

Prompting Large Language Model for Machine Translation—A Case Study, Biao et al., (Year: 2023).*

Visual representation of natural language scene descriptions, vol. 26, No. 4, Enrico et al., (Year: 1996).*

Vaidya et al., "TailorSQL: An NL2SQL System Tailored to Your QueryWorkload"; May 29, 2025; 13 pages; available: https://arxiv.org/abs/2505.23039.

Snowflake Documentation, "Cortex Analyst semantic model specification", available: https://docs.snowflake.com/en/user-guide/snowflake-cortex/cortex-analyst/semantic-model-spec; downloaded: Aug. 29, 2025.

Bird-Bench, "Bird-SQL", available: https://bird-bench.github.io/; downloaded: Aug. 29, 2025.

Amazon, "Interacting with Amazon Q generative SQL", available: https://docs.aws.amazon.com/redshift/latest/mgmt/query-editor-v2-generative-ai.html#query-editor-v2-generative-custom-context; downloaded: Aug. 29, 2025.

"Conceptual Guide" downloaded May 23, 2024 https://python.langchain.com/v0.2/docs/concepts/ (34 pages).

Wang et al., "Query2doc: Query Expansion with Large Language Models" arXiv:2303.07678 (2023) 10 pages.

Sui et al., "Table Meets LLM: Can Large Language Models Understand Structured Table Data? A Benchmark and Empirical Study" arXiv:2305.13062 (2024) 11 pages.

Jagerman et al., "Query Expansion by Prompting Large Language Models" arXiv:2305.03653 (2023) 7 pages.

Zheng, Qinkai, et al., "A Multilingual Code Generation Tool—CodeGeeX", https://codegeex.ai/, 2023, 8pgs.

Stenetorp, Pontus, et al., "brat: a Web-based Tool for NLP-Assisted Text Annotation", Proc. of the Demos at the 13th Conf of the EACL, Avignon, France: Association for Comp Linguistics, pp. 102-107, https://aclanthology.org/E12-2021, Apr. 2012, 6pgs.

SpaCy., "Industrial-strength Natural Language Processing in Python", spacy.io, 2020, 9pgs.

Johnson, Jeff, et al., "Billion-scale similarity search with GPUs", https://arxiv.org/pdf/1702.08734.pdf, Feb. 28, 2017, 12pgs.

Feng, Zhangyin, et al., "CodeBERT: A Pre-Trained Model for Programming and Natural Languages", Findings of the Assoctn for Computnl Linguistics: EMNLP 2020, pp. 1536-1547, https://doi.org/10.18653/v1/2020.findings-emnlp.139, Nov. 16, 2020, 12pgs.

Devlin, Jacob, et al., "BERT: Pre-training of Deep Bidirectional Transformers for Language Understanding", https://doi.org/10.48550/arXiv.1810.04805, Oct. 11, 2018, 14pgs.

Chen, Mark, et al., "Evaluating Large Language Models Trained on Code", https://arxiv.org/abs/2107.03374, Jul. 14, 2021, 35pgs.

"Tabnine is an AI assistant that speeds up delivery and keeps your code safe," Tabnine Ltd., https://www.tabnine.com/, 2023, 9pgs.

"Sourcery—Automatically Improve Code Quality", https://sourcery.ai/, 2023, 14pgs.

"Github copilot", GitHub Inc. https://github.com/features/copilot, 2023, 16pgs.

"GitHub Copilot litigation", Joseph Saveri Law Firm, https://githubcopilotlitigation.com/, 2023, 4pgs.

"ChatGPT: Optimizing Language Models for Dialogue", GOpenAI, LLC, https://chat.openai.com/, 2023, 1pg.

* cited by examiner

SYNTHETIC TABULAR METADATA GENERATOR USING LARGE LANGUAGE MODELS

FIELD OF THE INVENTION

The present invention relates to natural language processing (NLP). Herein is structuring of a generated lexical prompt that causes a large language model (LLM) to generatively infer a table schema that contains descriptive natural language.

BACKGROUND

Tabular data is a common representation format for compound data, especially for storage of bulk data such as in a spreadsheet or database table or for legibility of presentation in a user manual or technical document intended for a human. Data processing automation may readily tolerate otherwise insignificant deficiencies of description such as schema-less content, mangled identifiers, missing comments, and so-called Hungarian notation that Wikipedia teaches "look like they were written in some inscrutable foreign language". Those various descriptive deficiencies may render data unintelligible, which may be a more or less complete obstacle to important techniques such as analysis by hand or semantic analytics. Often table/column names use acronyms or abbreviations whose implied meaning may require expert domain knowledge to disambiguate. In many cases, descriptions of contents of a table or column are not provided or are scattered across multiple documents in the internal knowledge base of a company, which may be too costly to identify in ways of the state of the art.

Inaccuracy, such as a mistaken meaning of a table or column, would be catastrophic to any computer application whose internal or interface design were based on the mistaken meaning. For example, input data of mistaken meaning cannot be used to produce valid output, which is a phenomenon known in computer science as garbage in garbage out (GIGO).

For example, semantic inaccuracy may be quantitatively measured by any of the following metrics. Polysemy (i.e. lexical ambiguity) measures the number of possible meanings for individual words. Word error rate (WER) measures words that are typographically incorrect due to, for example, mistaken substitution, insertion, or omission. Metric for evaluation of text retrieval (METEOR) measures semantic fidelity by considering synonym matching and paraphrasing, including stemming and lemmatization. BERTScore measures semantic fidelity and linguistic fluency.

Error metrics such as those may quantitatively measure performance of any mode of unreliable text generation such as speech recognition or, herein, table recognition. Thus, semantic automation for tabular data is a technologic problem whose performance may be objectively and empirically inaccurate. For the state of the art to achieve a desired accuracy, which sometimes may be impossible, entails quantifiable computational latency, for which processor time is a precious physical resource for internal operation of a computer.

DETAILED DESCRIPTION

Figure 1:
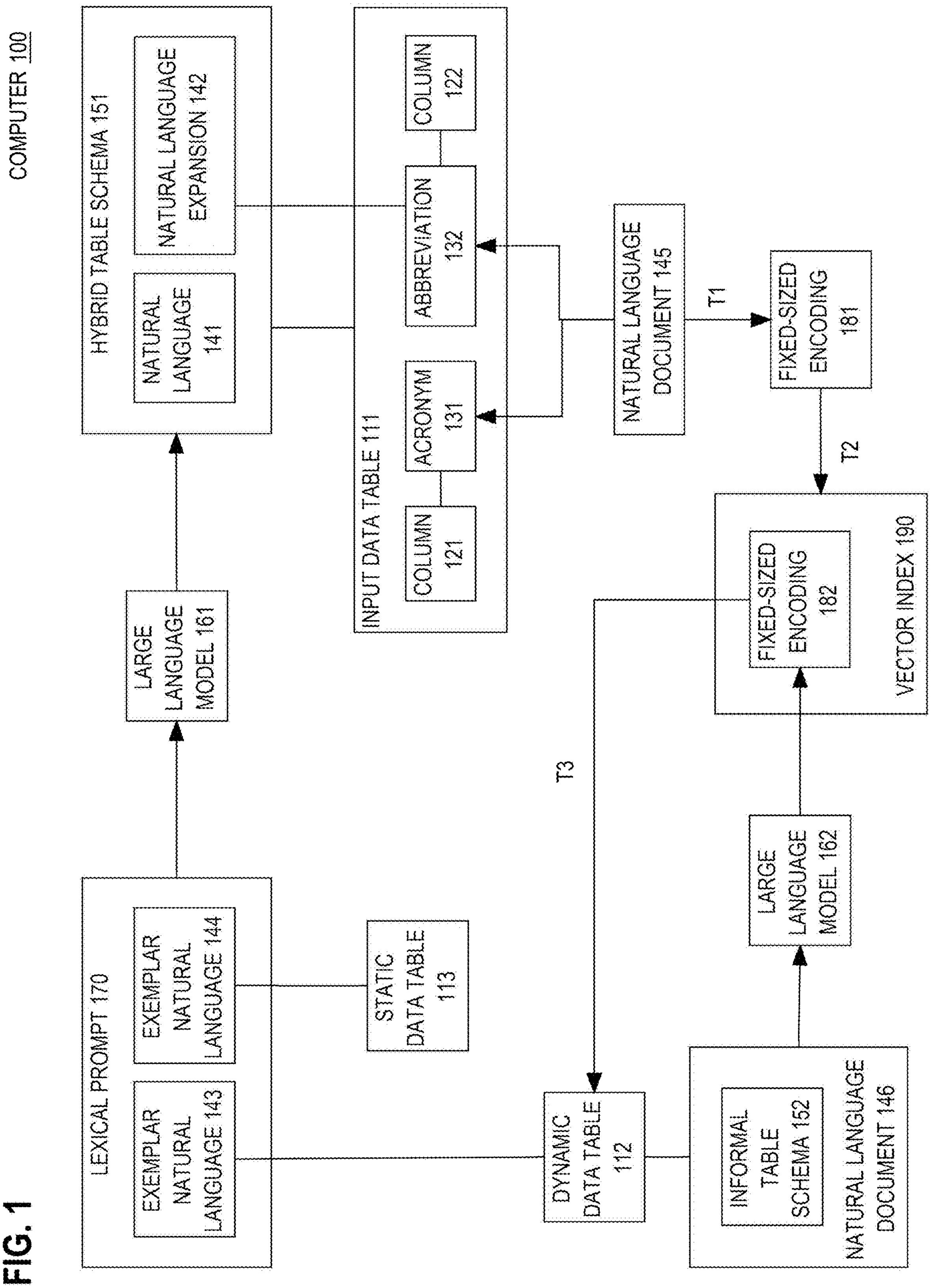
FIG. 1 is a block diagram that depicts an example computer that uses natural language processing (NLP) and structuring of a generated lexical prompt that causes a large language model (LLM) to generatively infer a hybrid table schema that contains natural language that describes an input data table and its columns.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are natural language processing (NLP) techniques for structuring of a generated lexical prompt that causes a large language model (LLM) to generatively infer a hybrid table schema that contains descriptive natural language. This approach overcomes any lack of preexisting tabular metadata and resolves uncertainty arising from ambiguous or unfamiliar notations in table/column names that contain stenographic compression such as acronyms, abbreviations, contractions, and words concatenation. This approach leverages information from public knowledge corpora as well as proprietary documentation to enrich the metadata information of a table.

Herein is a novel inference framework for LLMs using a combination of specialized techniques to synthetically generate realistic tabular metadata. This approach entails Retrieval Augmented Generation (RAG) to automatically harvest the most accurate information contained in domain-specific/internal documentation that may be more or less unamenable to state of the art analytics. This approach dynamically generates a complex prompt to cause an LLM to generatively infer contextually relevant metadata. Novel prompts herein are highly structured and, unlike any state of the art prompt to a human or a machine, may contain multiple redundant variations in a single prompt.

High performance of this novel schematic inference framework was measured on LLMs of various architectures and providers, which proves that this approach is model agnostic for any opaque (i.e. black box) LLM. This approach generates important kinds of metadata such as entity names and attribute names of real objects represented by a table and its columns. This generative approach transforms a missing or incomplete description into a complete description. If a table title or some column names are missing, this approach generates completely new names and descriptions, including a declaration of, for example, previously undeclared datatypes. In an exemplary embodiment, inferred datatypes use a structured query language (SQL) datatypes nomenclature (e.g. VARCHAR, DATE, NUMERIC, etc.) even when there is no preexisting SQL schema and even when the tabular data does not come from a database.

In an embodiment, an LLM is trained on a huge corpora of publicly available data to learn extensive background knowledge for a variety of generative documentary tasks. Herein, in-context learning is a special use of demonstrations of a task that are provided to the LLM as part of a prompt, and this enables the LLM to solve new pattern-based tasks without the need for fine-tuning or other retraining.

The LLM is trained to reliably and generatively infer metadata that conforms to one of multiple predefined response formats. Herein, a self-contained task demonstration that encapsulates sample input and correct expected output is referred to as an exemplar, and a prompt may contain one or multiple exemplars to guide the LLM to apply, in a learned way, a dynamically-specified generative pattern to a new table. In a RAG embodiment as discussed above, some exemplars may be dynamically selected and generated to maximize semantic similarity to the new table. Herein is a fixed-sized vector encoding that is a learned semantic encoding of any table, whether new or predefined, that facilitates comparison of tables to dynamically discover an earlier table that is most semantically similar to a new table. In an accelerated RAG embodiment, a vector index finds the one or few semantically most similar tables as discussed later herein.

As discussed in the above Background, semantic accuracy of a generative linguistic inference may be quantitatively measured. Dynamic use of a RAG during prompt generation increases semantic accuracy and, as discussed later herein, this accuracy is a characteristic of internal operation of the following example computer. Herein, task comprehension is an additional accuracy that measures how well, regardless of data semantics, does generatively inferred output conform to an expected format. Any accuracy metric discussed in the Background may, as a single score, be a combined measurement of semantic accuracy and task accuracy. The following example computer accepts novel prompts that are specially designed to increase task accuracy. Both of these accuracies of internal operation of the following example computer are increased in special ways discussed later herein.

1.0 Example Computer

FIG. 1 is a block diagram that depicts an example computer 100 that uses natural language processing (NLP) and structuring of generated lexical prompt 170 that causes large language model (LLM) 161 to generatively infer hybrid table schema 151 that contains natural language 141-142 that describe input data table 111 and its columns 121-122. Computer 100 may be one or more of a rack server such as a blade, a personal computer, a mainframe, or a virtual computer. In an embodiment, random access memory (RAM) in computer 100 can contain all of the components shown in FIG. 1.

In various embodiments, input data table 111 is a spreadsheet such as a comma separated values (CSV) text file, a database table or, as discussed later herein, a table in natural language document 145. In various scenarios, a natural language description of input data table 111 and its columns 121-122 does not exist or incompletely exists in a natural language document or a table schema. Herein, a natural language document is a word processor document, a webpage, an email, or a text file intended to be read by a person. Herein, natural language is a sequence of one or more words or non-words (e.g. abbreviation or acronym) such as prose or a table in a natural language document.

1.1 Special Kinds of Table Schema

Herein, a table schema may be a (e.g. structured query language, SQL) database schema or a multicolumn header of a spreadsheet. A multicolumn header may, for example, consist of names of columns in a table.

Discussed elsewhere herein, a formal table schema and an informal table schema are two distinct kinds of table schema that may, for example, describe a same data table. Herein, a formal table schema is intended for automatic use by a computer.

Herein, a minimal table schema and a hybrid table schema are two distinct kinds of formal table schema that may, for example, describe a same data table. Herein, a SQL relational schema is a minimal table schema. Herein, a multi-column header of a spreadsheet is a minimal table schema.

Herein, an informal table schema (e.g. partially shown in natural language document 145 in FIG. 2) is intended to be read by a human and contains natural language. Herein, an informal table schema may be a set of one or more natural descriptions that occur as adjacent or non-adjacent portions of a natural language document.

Figure 2:
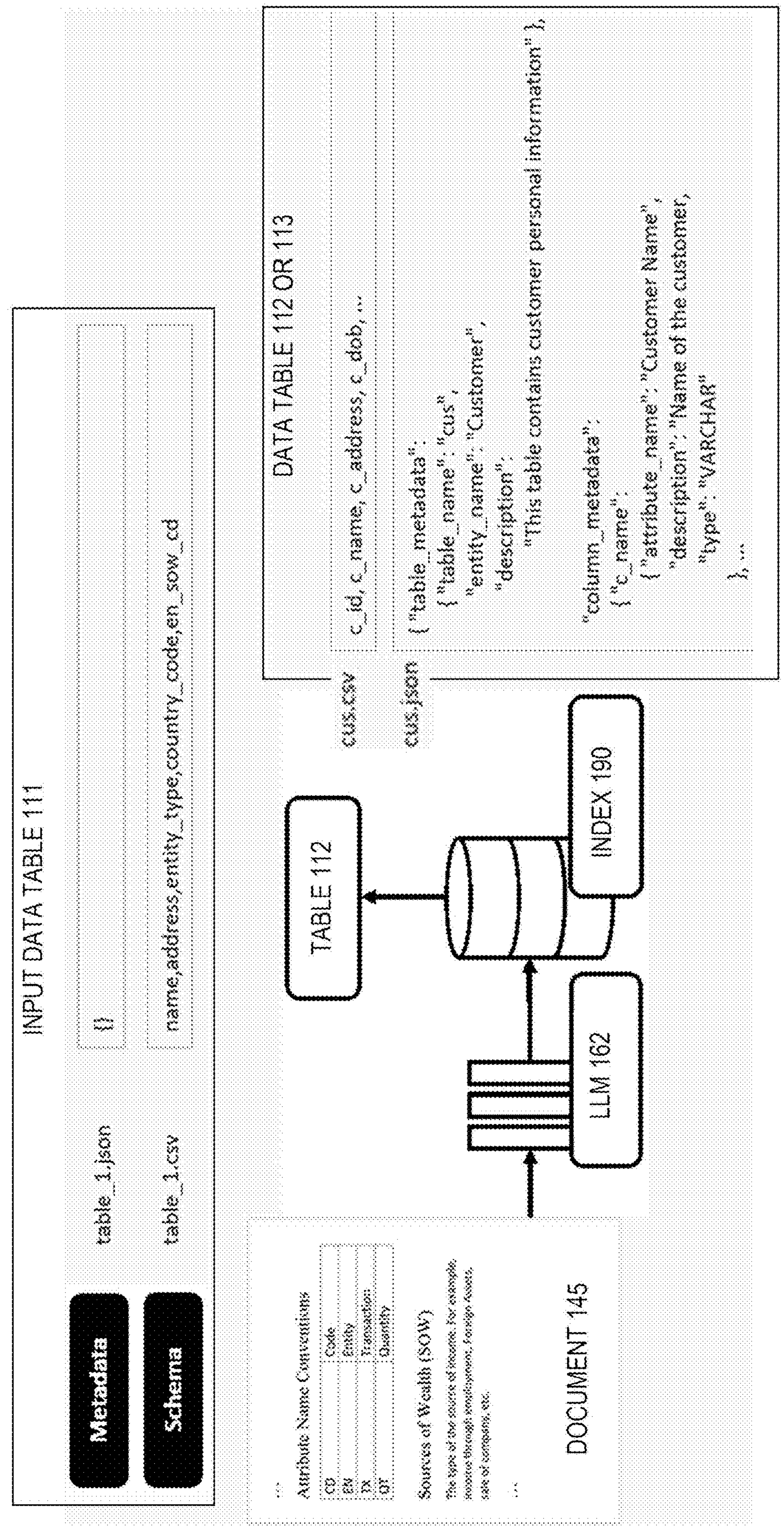
FIG. 2 is a block diagram that depicts an example computer that operates the lifecycle of a hybrid table schema.

For example, some parts of an informal table schema are shown, in natural language document 145 in FIG. 2, that contains a table between prose that says Conventions and prose that says Wealth. That table and those two pieces of prose are three adjacent portions of natural language document 145, and those three portions can be reused as parts of one or more informal table schemas.

In this example, the partial informal table schema shown in natural language document 145 in FIG. 2 is part of a table schema of input data table 111. However in this example, the table shown between the two pieces of prose: a) is not input data table 111 and b) instead provides an informal description of the en_sow_cd of input data table 111 as shown in FIG. 2.

1.2 Hybrid Table Schema

Herein, a hybrid table schema is a novel table schema that: a) can be processed by automatic analytics and b) contains natural language descriptions that a human would expect. In an embodiment, hybrid table schema 151 is a self-contained, well formed (i.e. parseable), and machine readable JavaScript object notation (JSON) or extensible markup language (XML) document that may contain natural language portions 141-142.

Herein, a data table may have one, some, or all of an informal table schema, a minimal table schema, and a hybrid table schema. Herein, all hybrid table schemas can be generatively inferred by LLM 161. Herein, no data table lacks a table schema. For example although shown without a table schema, static data table 113 has one or more unshown table schemas.

Herein, a data table that has a hybrid table schema also has either or both of an informal table schema and a minimal table schema. In an embodiment, computer 100 neither contains nor accesses data tables, including shown data tables 111-113, and instead only stores and processes their formal and informal table schemas. In that embodiment, data tables 111-113 are only demonstratively shown and might, for example, no longer exist. For example, generating exemplar natural language 144 may entail accessing a table schema of static data table 113 without accessing static data table 113 itself. Likewise as discussed later herein, vector index 190 may provide indexing and retrieval of table schemas instead of data tables.

1.3 Example NLP

In this example, the table shown between the two pieces of prose in FIG. 2 is a metadata table that provides an informal description of a column. Herein, a metadata table is not a data table.

If prose is available that incompletely describes input data table 111, the description may exist as portions that are scattered throughout a natural language document. In any case, input data table 111 and its columns 121-122 have names that might not be proper natural language and may be more or less facially unintelligible. For example, a name may be an acronym or a contraction of one or more words. For example, acronym 131 is the name of column 121, and abbreviation 132 is the name of column 122. An acronym such as N. that might mean north or might mean new might be inherently ambiguous if surrounding context is disregarded. An abbreviation such as XmplAbrrvtn might be unconventional.

Large language model (LLM) 161 generates (i.e. generatively infers) hybrid table schema 151 that is a fluent and unambiguous natural language description of input data table 111 and columns 121-122. Hybrid table schema 151 is a highly accurate description of input data table 111 and columns 121-122. Hybrid table schema 151 is consolidated (i.e. monolithic, self-contained). For example, table schema 151 may be a self-contained and machine readable JSON or XML document that may contain natural language portions 141-142.

1.4 NLP Generative Inferencing

For example, natural language 142 may describe column components 122 and 132, and natural language 141 may describe input data table 111 or column components 121 and 131. LLM 161 accepts lexical prompt 170 as a sole input that causes LLM 161 to generate hybrid table schema 151. For example, natural language expansion 142 may contain the word north, even though lexical prompt 170 might not contain the word north. For example, abbreviation 132 may be a single letter N. In other words, LLM 161 can select words and synthesize phrases and sentences that lexical prompt 170 might not contain. In that way, hybrid table schema 151 may contain new descriptive information (i.e. metadata) that was not previously associated with input data table 111 and did not expressly occur in lexical prompt 170. That is, LLM 161 synthesizes (i.e. generates) new data that the state of the art could not.

In an embodiment, LLM 161 generatively infers hybrid table schema 151 by accessing only information contained inside components 161 and 170. In other words, prompted generative inferencing by LLM 161 is entirely self-contained and does not access additional information.

1.5 Innovative Lexical Prompt

Lexical prompt 170 is natural language text that may contain names of input data table 111 and columns 121-122 that may be cryptic (i.e. unclear) as discussed above. For example, the state of the art may be unable to generate natural language that describes a name or may generate natural language for a wrong meaning of a facially ambiguous name. That is, the state of the art is inaccurate, and hybrid table schema 151 has increased accuracy. Herein, accuracy is empirical and may be quantified such as by a count or ratio of incorrect or missing words, phrases, or sentences in hybrid table schema 151. For example, hybrid table schema 151 might be completely accurate.

Lexical prompt 170 may contain one or more distinct and reusable exemplar natural language 143-144. For example, computer 100 may use one textual pattern (e.g. prose template with placeholders for data) to generate exemplar natural language 143 and a same pattern to generate exemplar natural language 144. Herein prose is natural language. Natural language may have a particular pattern or structure such as linguistic syntax. Exemplar natural language 143-144 individually have a same particular pattern or structure, which is the same pattern as the entirety of natural language in hybrid table schema 151 of which natural language 141-142 are parts. That uniformity of structure between input and output of LLM 161 is because LLM 161 was trained to propagate linguistic syntax from lexical prompt 170 into hybrid table schema 151, which is why natural language 143-144 are referred to herein as exemplars. However, exemplar natural language 143-144 are not identical because each describes a different respective data table as discussed later herein.

1.6 Example Linguistic Commands

In an embodiment, lexical prompt 170 is natural language that consists of a natural language command followed by natural language exemplar(s). The following is a first natural language command that contains multiple natural sentences that may be predefined (i.e. does not depend on any component shown in FIG. 1).

> Write a meaningful one-sentence description for each column in the following tables. Avoid redundant descriptions.

In an embodiment, the above first natural language command also includes the following natural language supposition that may be predefined. This novel natural language supposition minimizes ambiguity in hybrid table schema 151 and prevents hallucination (i.e. spurious generative inferencing) of fake information by LLM 161, thereby increasing the accuracy and reliability of hybrid table schema 151. The following natural language supposition contains multiple natural sentences that increase the accuracy of the natural language command and thus the accuracy of components 141-142, 151, and 100. Here is the natural language supposition that may be prepended onto the above first natural language command for increased accuracy.

> You are a data engineer happy to help solve the task assigned to you. You always try to avoid giving false or misleading information, and you really do your best to not let caution get too much in the way of being useful.

In an embodiment, multiple distinct natural language commands may contain the same above reusable natural language supposition, such as the following second natural language command. However, further discussion herein may instead focus on the first natural language command.

> Write a meaningful title for the following tables.

1.7 Natural Language Exemplars in Linguistic Template

Herein, a lexical prompt is based on one input data table and one or more exemplar data tables. In the shown example, those are input data table 111 and exemplar data tables 112-113. The following is a linguistic archetype template that computer 100 may combine with data tables 111-113 to instantiate (i.e. generate) a linguistic archetype that is natural language that lexical prompt 170 may contain. In this example, the generated linguistic archetype contains exemplar natural language 143-144. As discussed later herein, linguistic archetype instantiation may entail: a) replacing STATIC_EXAMPLE_TABLE with data table 113, b) replacing DYNAMIC_EXAMPLE_TABLE with data table 112, and c) replacing INPUT_TABLE with input data table 111.

The following linguistic archetype template contains sections 1-4. Section 1 contains the respective table schema of each exemplar table. Herein, section 1 is also referred to as the exemplar schema section. Section 2 describes section 1. Herein, section 2 is also referred to as the exemplar description section. Section 3 contains the table schema of the input data table. Herein, section 3 is also referred to as the input schema section. Section 4 describes section 3. Herein, section 4 is also referred to as the input description section. Here is a linguistic archetype template.

Section 1
Table STATIC_EXAMPLE_TABLE, columns=[col_name_1, col_name_2, . . . ], metadata={metadata of the table except the field that is supposed to be generated at this step}
Table DYNAMIC_EXAMPLE_TABLE, columns=[col_name_1, col_name_2, . . . ], metadata={existing metadata, if any, except the field that is supposed to be generated at this step}
Section 2
STATIC_EXAMPLE_TABLE
Answers for STATIC_EXAMPLE_TABLE
DYNAMIC_EXAMPLE_TABLE
Answers for DYNAMIC_EXAMPLE_TABLE
Section 3
Table INPUT_TABLE, columns=[col_name_1, col_name_2, . . . ], metadata={metadata that was either provided in the input or generated in the previous steps}
Section 4
INPUT_TABLE 1.8 Innovative Prompt The following is a linguistic archetype that is populated with data tables 111-113. Lexical prompt 170 may contain this linguistic archetype. This linguistic archetype may contain exemplar natural language 143-144. In this example: a) Market News Event is a static exemplar table that is data table 113, b) ACCOUNT_PHONE is a dynamic exemplar table that is data table 112, and c) date-entity-examples is the input table that is input data table 111.

Herein, template instantiation may insert natural language into some or all of sections 1-3, but not section 4 that contains only the name of an input table or input table column whose description will be generatively inferred by LLM 161. For example, section 4 may consist of a name that consists of one or more natural words or non-words, and that name may be either of non-words 131-132, or the name of input data table 111.

Herein, exemplar natural language may be contained in one or both of exemplar sections 1-2. In one example, section 1 contains exemplar natural language 143 that below contains a natural sentence that says news service. In another example, section 2 contains exemplar natural language 143 that below contains a natural phrase that says unique identifier.

In various examples, exemplar natural language 143-144 occur in a same or different one of exemplar sections 1-2 and/or describe a same or different exemplar data table. For example in section 2, exemplar natural language 143-144 may describe different columns of a same or different exemplar data table. As instantiated from the above linguistic archetype template, here is a linguistic archetype that lexical prompt 170 may contain.

Section 1
Table Market News Event, columns=[Security Identifier, News Event Date, News Event Time, Headline Text, Source System], metadata={'table_metadata': {'description': 'This file contains market news events relating to a specific security that has been published by a news service (for example, Dow Jones or Reuters).'}, 'column_metadata': {'Security Identifier': {'type': 'CHAR(50)'}, 'News Event Date': {'type': 'DATE'}, 'News Event Time': {'type': 'TIME'}, 'Headline Text': {'type': 'CHAR(300)'}, 'Source System': {'type': 'CHAR(3)'}}}
Table ACCOUNT_PHONE, columns=[fic_mis_date, account_number, data_origin, phone_purpose_type, phone_no, phone_extn, iso_country_cd], metadata={"table_metadata": { }, "column_metadata": { }}
Section 2
Market News Event
Security Identifier: Identifier of the security about which this market news story is written
News Event Date: Date when this market news story about this security was published
News Event Time: Time when this market news story about this security was published
Headline Text: Headline text of this market news story
Source System: Source system from which this data content is extracted
ACCOUNT_PHONE
fic_mis_date: The date as on which the snapshot of source data extracted for processing
account_number: The unique identifier of the account/contract held by the customer
data_origin: The source system from where data is extracted
phone_purpose_type: Purpose, or usage, of this phone relative to this account
phone_no: Phone number associated with the account
phone_extn: Extension number at which the account holder can be reached at
iso_country_cd: Country associated with this phone number given in the customer records
Section 3
Table date-entity-examples, columns=[xmplTxt, E_D], metadata={'table_metadata':
{'entity_name': 'Extraction of Date Entities from Text', 'description': 'This table contains examples of text that contains a date entity, along with the extracted date.'}, 'column_metadata': { }}
Section 4
date-entity-examples In an embodiment, lexical prompt 170 consists of a concatenation in the following sequence: 1) a natural language supposition, 2) a natural language command, and 3) sections 1-4 of a linguistic archetype. In an embodiment, a natural language supposition is optional or unimplemented. In this example, lexical prompt 170 contains the above linguistic archetype and first natural language command, and hybrid table schema 151 is the following generatively inferred description that contains two natural phrases that may be natural language 141-142.

xmplTxt: A sentence that contains a valid date entity
E_D: The date that was extracted from the text

1.9 Selection Of Exemplar Table(s)

In an embodiment, selection of data tables 112-113 for exemplar template instantiation is as follows. Vector index 190 is prepopulated with many predefined data tables, including dynamic data table 112. As discussed below, vector index 190 dynamically selects and returns a predefined data table that is the most similar to input data table 111. High-performance implementations of vector index 190 are discussed later herein.

Static data table 113 is predefined (i.e. does not depend on any component shown in FIG. 1) and may be often or always reused for many natural language commands and many input data tables. Static data table 113 is pedantic and may be statically preselected from a preexisting corpus of training or validation of LLM 161 as follows. In various embodiments: a) manual static preselection entails expertise of a data scientist, or b) LLM achieved a best performance score (e.g. lowest training error or a highest validation accuracy) for lexical prompts that contained linguistic archetypes whose sections 1-3 contained the table schema of a particular data table that, once identified as best, can be the automatic static preselection. For example, vector index 190 may or may not contain static data table 113.

1.10 Vector Indexing of Semantic Encodings

In an embodiment, LLM 162 was trained to infer a fixed-size encoding that represents a given data table. For example, LLM 162 may generate fixed-size encodings 181-182 as respective inferences that represent respective data tables 111-112. Herein, all fixed-size encodings have a same width (i.e. count of bytes or array elements). In an embodiment, fixed-size encodings are numeric arrays whose elements are numbers. Vector index 190 dynamically selects dynamic data table 112 as follows. In various embodiments, LLM 162 can use any techniques for natural language processing and learned semantic encoding of natural language as presented in U.S. patent application Ser. No. 18/226,502 TRANSFORMING TABLES IN DOCUMENTS INTO KNOWLEDGE GRAPHS USING NATURAL LANGUAGE PROCESSING filed by Doga Tekin et al on Jul. 26, 2023 that is herein incorporated in its entirety.

The lifecycle of vector index 190 may have a build phase followed by a probe phase. When the build phase begins, vector index 190 is empty. During the build phase: a) LLM 162 individually infers a respective fixed-sized encoding for each predefined data table in a preexisting corpus, and b) in vector index 190, each of those predefined data tables is associated with its own fixed-size encoding. The build phase may occur before LLM 161 is ready for operation.

LLM 162 and vector index 190 cooperate during the probe phase that does not entail LLM 161 as follows. The probe phase has shown steps T1-T3. In step T1, LLM 162 accepts input data table 111 as input and dynamically and generatively infers fixed-sized encoding 181 that represents input data table 111. In step T2, vector index 190 accepts fixed-sized encoding 181 as a lookup key. Between steps T2-T3, vector index 190 dynamically detects that fixed-sized encoding 181 is most similar to fixed-sized encoding 182, and c) in step T3, vector index 190 returns dynamic data table 112 that is associated with (i.e. represented by) fixed-sized encoding 182.

1.11 Additional NLP for Information Extraction From Natural Documents

The following is an information extraction embodiment in which LLM 162 generatively infers fixed-sized encodings 181-182 from respective natural language documents 145-146. For example as shown in FIG. 2 as discussed later herein, natural language document 145 may contain (e.g. scattered, i.e. textually non-adjacent) natural language specifications of some or all parts of input data table 111. For example, natural language documents 145-146 may be reference documents such as technical documents that respectively contain or accompany data tables 111-112.

For example, natural language document 146 may contain a more or less informal (i.e. natural language) table schema 152 that represents dynamic table 112. In other words, natural language document 146 may contain information sufficient to extract and synthesize (i.e. generate) a formal representation of informal schema 152 such as discussed for FIG. 2 later herein. Likewise, natural language document 145 may contain informal schema information sufficient to extract and synthesize table_1.csv as shown in FIG. 2 as discussed later herein. In various embodiments, computer 100 can use any techniques for extracting and synthesizing tabular data and metadata (i.e. schematic information) from a natural language document as presented in U.S. patent application Ser. No. 18/226,502.

1.12 Exemplary Embodiment Of High-Performance Index

As discussed earlier herein, each of fixed-sized encodings 181-182 may be an array of numbers. In a multidimensional embodiment, vector index 190 comprises a multidimensional index that treats each number in a numeric array as a value in a respective distinct dimension. For example if fixed-sized encoding 181 contains ten numbers, then fixed-sized encoding 181 has ten dimensions, and all fixed-sized encodings herein have a same predefined width (i.e. count of numbers, count of dimensions).

Between steps T2-T3 as discussed earlier herein, vector index 190 dynamically detects that fixed-sized encoding 181 is most similar to fixed-sized encoding 182, which the multidimensional index may implement as multidimensional nearest neighbor detection. In that case, fixed-sized encodings 181-182 are points in a multidimensional space, and the spatial distance between both points may be Euclidian diagonal or Manhattan rectilinear.

In an accelerated embodiment, vector index 190 comprises a multidimensional nearest neighbor index that is implemented with Facebook AI similarity search (FAISS). As discussed earlier herein, vector index 190 may have a build phase and a probe phase. The build phase may initially generate an empty vector index 190 in RAM by instantiating FAISS's IndexIVFFlat that is an inverted index of numeric vectors (i.e. numeric arrays).

Also during the build phase as discussed earlier herein, LLM 162 may individually infer a respective fixed-sized encoding for each predefined data table in a preexisting corpus. Population of the IndexIVFFlat may entail invoking its add( ) method that accepts all of those fixed-size encodings as a set of many input vectors, including fixed-sized encoding 182. However, IndexIVFFlat does not store copies of the fixed-size encodings, but instead uses a more compact and accelerated internal representation of the dimensions of the input vectors.

During the probe phase, IndexIVFFlat's search( ) method accepts fixed-size encoding 181 and returns fixed-sized encoding 182 as the nearest neighbor. As discussed earlier herein, lexical prompt 170 may contain exemplar natural language for multiple dynamic data tables, and IndexIVF-Flat's search( ) method can return a small set of multiple nearest neighbors, such as the top two nearest neighbors.

In an embodiment, the build phase and the probe phase are separated by much time, and vector index 190 may persist between both phases. For example, a computer in a laboratory environment may perform the build phase, and a different computer in a production environment may perform the probe phase. In that case in the FAISS embodiment, invoking IndexIVFFlat's write_index( ) method, at the end of the build phase, generates a single index file that contains a serialization of fully populated vector index 190 that may be copied into production and deserialized to generate a prepopulated identical instance of vector index 190.

2.0 Example Computer Display

FIG. 2 is a block diagram that depicts computer 100 that operates the lifecycle of hybrid table schema 151. Components 100, 111-113, 145, 162, and 190 shown in FIG. 2 are the same components shown in FIG. 1. FIG. 2 has a top half and a bottom half.

The top half shows input data table 111 as a rectangle that, in an embodiment, is displayed to a user on a display screen that is part of computer 100. Shown inside that rectangle are two dark rectangles that, in an interactive embodiment, may be buttons that a user may individually press to process input data table 111 as follows. As discussed earlier herein and below, computer 100 may process a data table by accessing table schema(s) of the data table without accessing the data table itself.

In an embodiment, an input data table always has a minimal schema as discussed earlier herein. In an embodiment, selection of input data table 111 entails using the Schema button for interactive selection of a minimal schema. In an embodiment, interactive selection of a minimal schema entails selecting a file that contains the minimal schema.

In the shown example, table_1.csv is the selected file that is a text file that contains input data table 111 as a spreadsheet that begins with a header row (i.e. line of text) that contains exactly the shown text string that contains four shown commas that separate names of five columns. In other words, according to the shown minimal schema, input data table 111 is selected, is named table_1, and has five columns. In an example not shown, a.ddl (i.e. data definition language) text file instead is selected for the minimal schema that is a SQL relational schema. In that case and unlike a spreadsheet, the .ddl file does not contain input data table 111 itself, and computer 100 might not have access to input data table 111 itself as discussed earlier herein.

As discussed earlier herein, hybrid table schema 151 may be JSON stored in a .json text file. In the shown example, the user does not press the Metadata button, and the .json file and hybrid table schema 151 do not yet exist because LLM 161 has not yet operated, which is why the shown JSON is only an empty pair of curly braces.

2.1 Example Lifecycle Of Hybrid Table Schema

The top half of FIG. 2 shows only input data table 111. All other components shown in FIG. 2 are in the bottom half that is not displayed to the user. In the bottom half are shown text files cus.csv and cus.json that respectively contain a minimal table schema and a hybrid table schema for predefined data table 112 or 113. Here, predefined may mean, for example, that cus.csv was already manually written or generated by computer 100, and that cus.json was already manually written or generatively inferred by LLM 161. For example, shown dynamic retrieval of dynamic data table 112 from vector index 190 may entail cus.json being returned by vector index 190. For example, one of exemplar natural language 143-144 may contain natural language copied from cus.json and column names copied from cus.csv or cus.json. In an embodiment, a lexical prompt template uses cus.json as the only parameter needed to instantiate that one of exemplar natural language 143-144. For example, each of exemplar natural language 143-144 may be instantiated with a respective template parameter that is a distinct .json text file.

FIG. 1 and the bottom half of FIG. 2 show dynamic selection of dynamic data table 112, which occurs only after input data table 111 is selected, for example interactively in the top half as discussed above. In an extended scenario in the following sequence: 1) LLM 161 generatively infers hybrid table schema 151, 2) computer 100 reboots after persisting hybrid table schema 151 in table_1.json, 3) the Metadata button is pressed to interactively select input data table 111 by selecting the table_1.json text file, and 4) instead of showing empty curly braces, JSON similar in structure to cus.json is shown in the top half.

In the scenario shown in the bottom half, some or all of natural language document 145, including the shown prose and Conventions table, is accepted as input by LLM 162 to generatively infer fixed-sized encoding 181.

3.0 Example Generative Process

Figure 3:
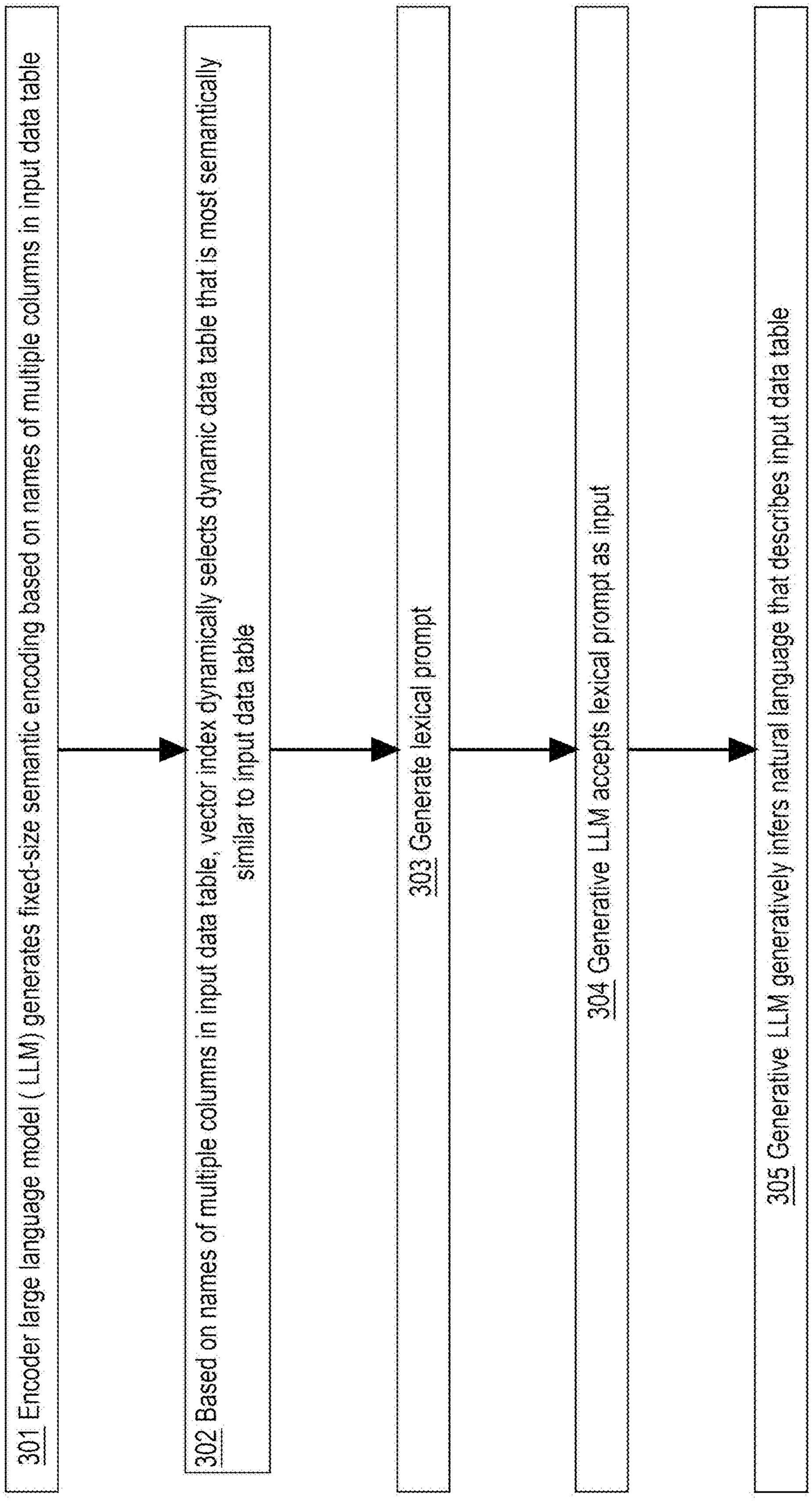
FIG. 3 is a flow diagram that depicts an example computer process that generatively infers a hybrid table schema.

FIG. 3 is a flow diagram that depicts an example process that computer 100 may perform to generatively infer hybrid table schema 151. Herein, LLM 162 is referred to as an encoder LLM because it accepts input and generatively infers fixed-size encodings that herein are referred to as semantic encodings because they reflect the semantics (i.e. meaning) of the input that is encoded. In various examples, that input contains one or more of: a) the data table, b) a minimal table schema or informal table schema of the data table, and c) part or all of a natural language document that completely or incompletely describes the data table.

Step 301 is step T1 in FIG. 1 in which LLM 162 generates fixed-size semantic encoding 181, for example based on names of columns 121-122 in input data table 111.

Step 302 occurs between steps T2-T3. Based on fixed-size semantic encoding 181 that is based on names of columns 121-122 in input data table 111, vector index 190 dynamically selects dynamic data table 112 that is most semantically similar to input data table 111 in step 302. In an embodiment, step 302 dynamically selects fixed-size encoding 182 as the nearest neighbor of fixed-sized encoding 181 as discussed earlier herein, such as by comparison such as by distance measurement.

Steps 303-305 occur after step T3. Step 303 generates lexical prompt 170 as discussed earlier herein. Herein, LLM 161 is referred to as a generative LLM or a prompted LLM because, as discussed earlier herein, LLM 161 accepts lexical prompt 170 as input in step 304 and generatively infers hybrid table schema 131 and natural language 141-142 that describes input data table 111 and its columns 121-122 in step 305.

In a granular embodiment, the process of FIG. 3 may be separately invoked to infer individual respective components of hybrid table schema 131. For example, inferential generation of components such as table title, table description, column name, column description, column data type may entail respective distinct prompts that separately invoke LLM 161 to generate distinct portions of hybrid table schema 131 that can be combined to assemble a complete hybrid table schema 131. In various granular embodiments, one invocation of LLM 161 may or may not generate multiple distinct portions of a same kind. For example, whether generating two column names requires one or two invocations of LLM 161 may depend on the embodiment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
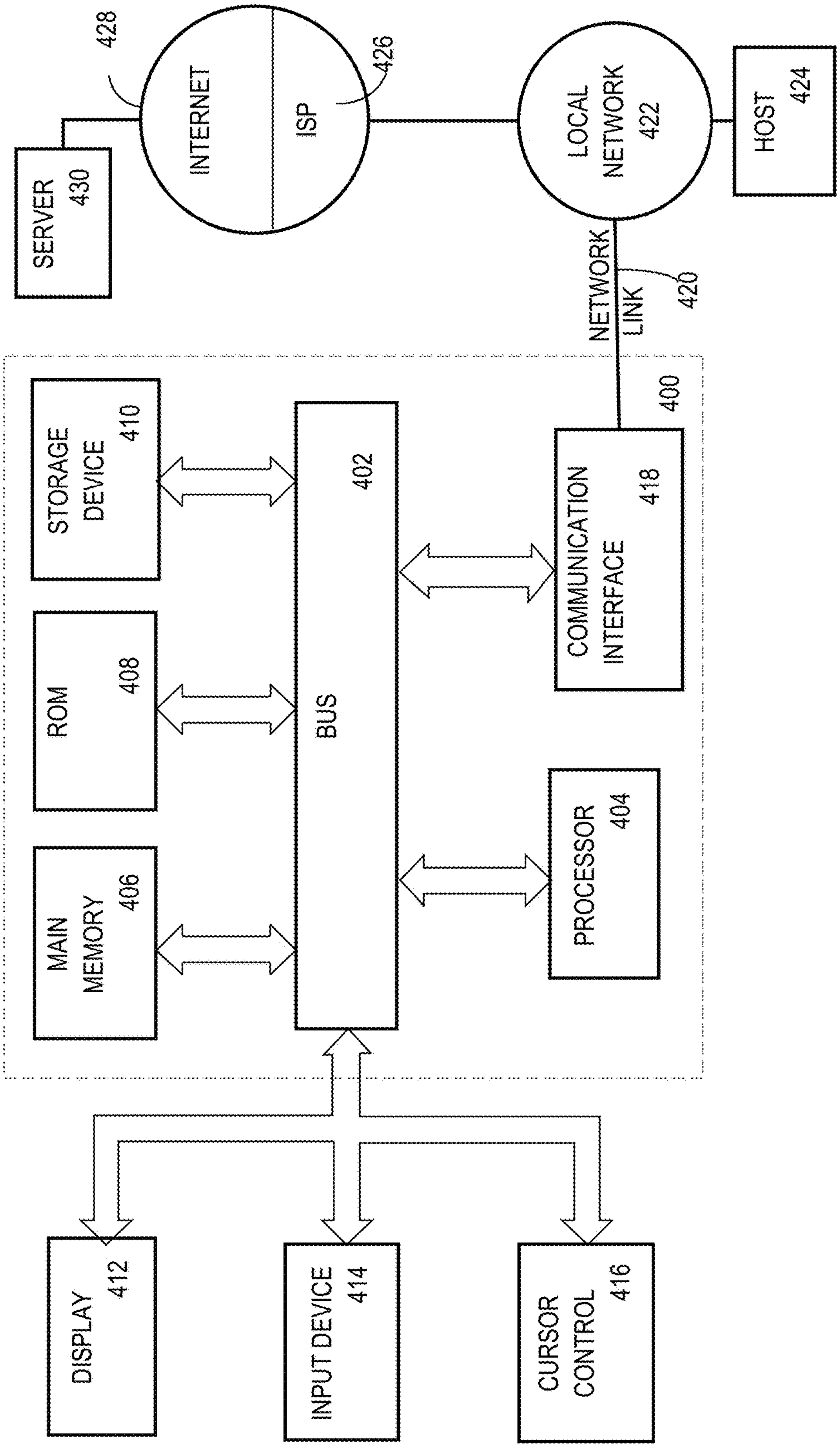
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
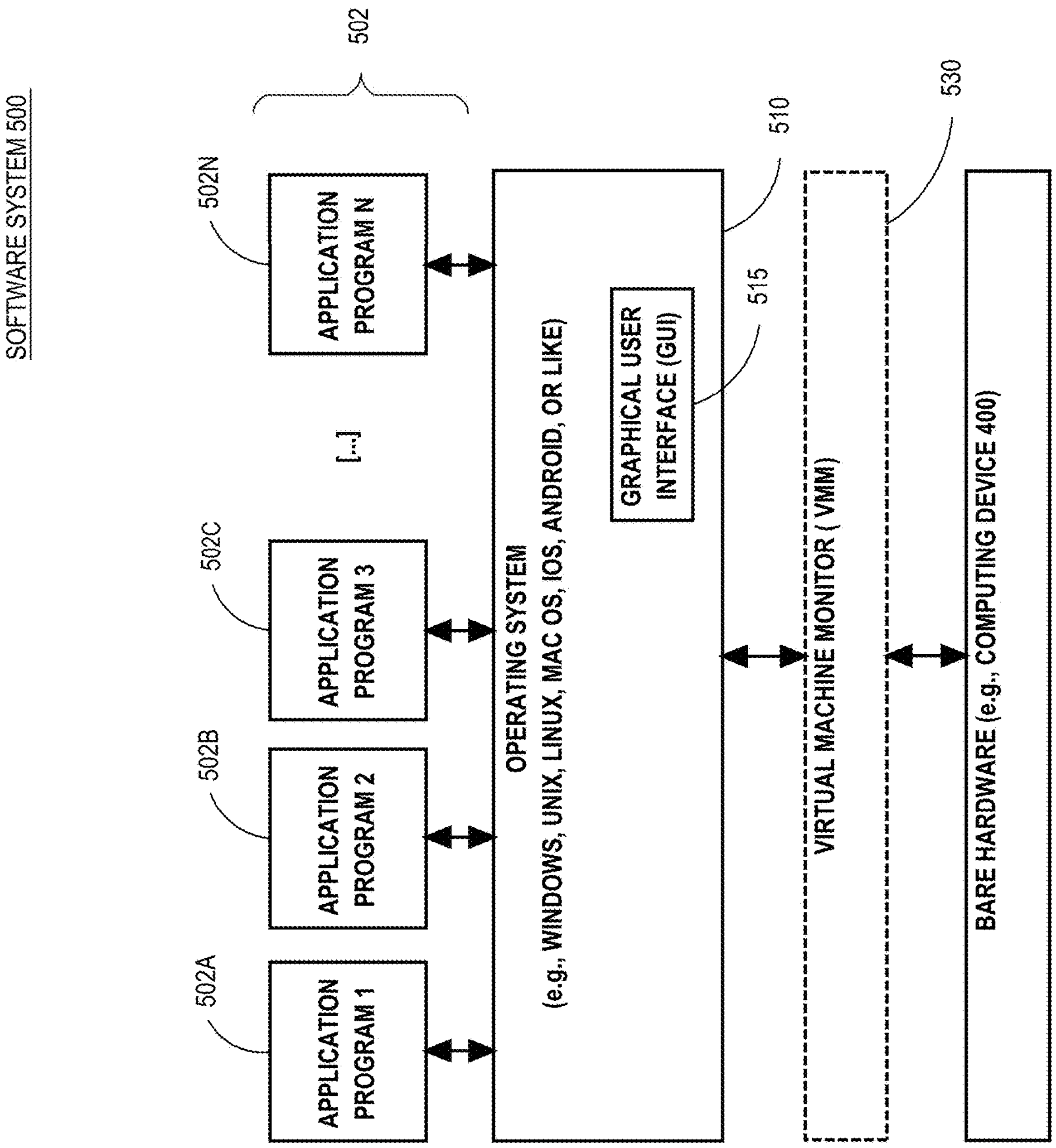
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria are met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of the best breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neurons.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as a vector. Training data comprises multiple inputs, each being referred to as a sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Fewer neurons means fewer activation values need be computed, and/or fewer derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in a matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that are not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depend on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2 (1): 1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

generating, based on text that describes a data table, a lexical prompt that contains a reusable predefined natural language supposition, wherein the text comprises at least one selected from a group consisting of:

a name of the data table, a structured query language (SQL) schema of the data table, and names of multiple columns in the data table;

accepting, by a large language model (LLM), the lexical prompt as input; and generating, by the LLM, natural language that describes the data table;

wherein the method is performed by one or more computers.

2. The method of claim 1 further comprising generating, by the LLM, a hybrid table schema of the data table that contains the natural language that describes the data table.

3. The method of claim 2 wherein the hybrid table schema of the data table contains JavaScript object notation (JSON).

4. The method of claim 1 wherein:

the data table is a first data table;

the lexical prompt contains example natural language that describes a second data table.

5. The method of claim 4 further comprising selecting the second data table based on names of multiple columns in the first data table.

6. The method of claim 5 wherein:

the method further comprises generating a fixed-size encoding based on the names of the multiple columns in the first data table;

said selecting the second data table is based on the fixed-size encoding.

7. The method of claim 6 wherein said selecting the second data table comprises comparing the fixed-size encoding to a fixed-size encoding of a table schema of the second data table.

8. The method of claim 7 wherein said comparing is performed by a vector index that contains the fixed-size encoding of the table schema of the second data table.

9. The method of claim 6 wherein said generating the fixed-size encoding is performed by a second LLM.

10. The method of claim 9 further comprising the second LLM accepting input that contains a natural language document that describes the first data table.

11. The method of claim 4 wherein the lexical prompt contains example natural language that describes at least one selected from a group consisting of a third data table and a table schema of the second data table.

12. The method of claim 1 wherein the natural language that describes the data table comprises natural language that describes a column in the data table.

13. The method of claim 12 wherein:

a name of the column contains an acronym or an abbreviation;

the natural language that describes the column contains an expansion of the acronym or the abbreviation.

14. The method of claim 1 wherein the data table is one selected from a group consisting of a table in a natural language document, a spreadsheet, and a database table.

15. One or more computer-readable non-transitory media storing instructions that, when executed by one or more processors, cause:

generating, based on text that describes a data table, a lexical prompt that contains a reusable predefined natural language supposition, wherein the text comprises at least one selected from a group consisting of:

a name of the data table, a structured query language (SQL) schema of the data table, and names of multiple columns in the data table;

accepting, by a large language model (LLM), the lexical prompt as input; and generating, by the LLM, natural language that describes the data table.

16. The one or more computer-readable non-transitory media of claim 15 wherein the instructions further cause generating, by the LLM, a hybrid table schema of the data table that contains the natural language that describes the data table.

17. The one or more computer-readable non-transitory media of claim 15 wherein:

the data table is a first data table;

the lexical prompt contains example natural language that describes a second data table.

18. The one or more computer-readable non-transitory media of claim 17 wherein the instructions further cause selecting the second data table based on names of multiple columns in the first data table.

19. The one or more computer-readable non-transitory media of claim 18, wherein:

the instructions further cause generating a fixed-size encoding based on the names of the multiple columns in the first data table;

said selecting the second data table is based on the fixed-size encoding.

20. The one or more computer-readable non-transitory media of claim 19 wherein said selecting the second data table comprises comparing the fixed-size encoding to a fixed-size encoding of a table schema of the second data table.

21. The one or more computer-readable non-transitory media of claim 15 wherein the natural language that describes the data table comprises natural language that describes a column in the data table.

* * * * *